March 9, 1954     E. M. PRUDLO     2,671,302
SELF-CLEANING RAKE
Filed June 6, 1951
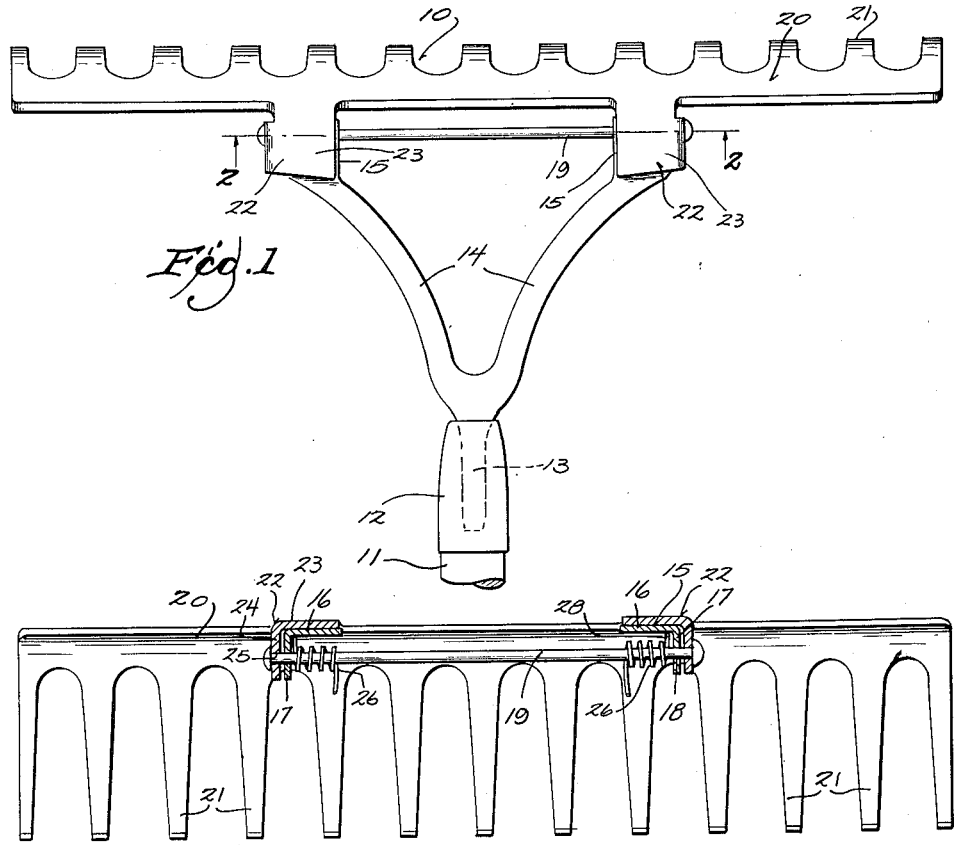
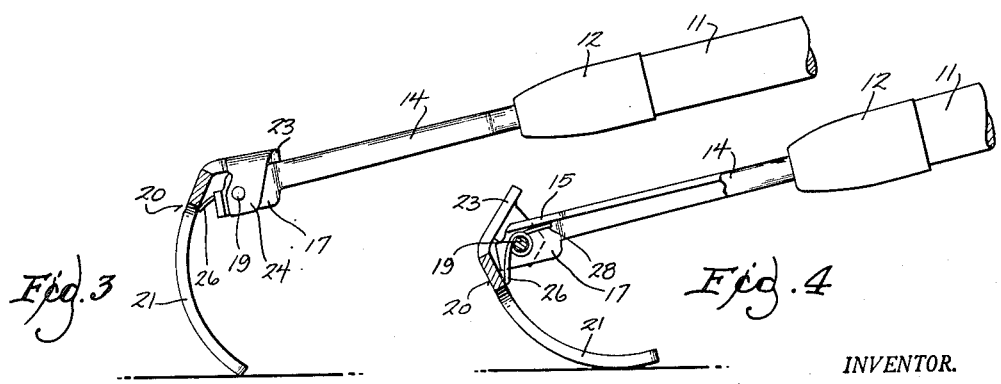
INVENTOR.
EUGENE M. PRUDLO
BY
Gerald P. Welch
ATTORNEY Patented Mar. 9, 1954

2,671,302

UNITED STATES PATENT OFFICE 2,671,302

SELF-CLEANING RAKE

Eugene M. Prudlo, Cudahy, Wis.

Application June 6, 1951, Serial No. 230,161

1 Claim. (Cl. 56—400.2)

This invention relates to improvements in rakes and more particularly to a novel rake of the self-cleaning type.

An object of the invention is to provide a device of the type having features of inexpensive construction and durability not found in similar devices of the type.

With the above and other objects in view as will appear as the description proceeds, the invention consists in certain novel features of construction, and in the combination and arrangement of parts as will be hereinafter more fully described and claimed.

In the drawing:

Fig. 1 is a plan view of a self-cleaning rake embodying the invention.

Fig. 2 is a view taken on line 2—2 of Fig. 1.

Fig. 3 is a side view in elevation of the rake in a position for use.

Fig. 4 is a view of the rake in depressed position for cleaning the litter from the teeth thereof.

Referring more particularly to the drawing, the numeral 10 designates the device generally, having a handle 11, a ferrule 12, a torque 13 integrally formed with a pair of arcuately diverging arms 14. The outer ends of the arms 14 comprise the angular plates 15 formed of horizontal portions 16 and the downwardly directed vertical portions 17 apertured as at 18 to journal the rod 19. The rake head 20 is provided with a plurality of teeth 21 and a pair of spaced opposed angular plates 22 comprised of horizontal portions 23 and downwardly disposed vertical portions 24 which latter are apertured to accommodate the rod 19 as at 25. A pair of coiled springs 26 embrace the rod 19 under each plate 15, and their inner ends extend and abut against certain of the teeth 21 with their outer ends 28 extended and brazed to the under side of the angular diverging arms 14 adjacent to the plates 15.

In use, the coil springs 26 normally maintain the teeth 21 substantially at right angles relatively to the handle member 11 with the plates 15 and 22 in close contact. In pulling the rake 10 backwardly in the conventional manner, the cooperation of the two sets of angular plates 15 and 22 results in a rugged structure for the purpose. When the handle 11 is pushed forwardly with a movement bearing downwardly against the teeth 21, the entire rake head 20 will rotate through an angle of approximately ninety degrees whereupon further forward movement of the teeth 21 against the ground will serve to dislodge and free any litter engaged between said teeth, thus readily and easily cleaning the rake.

It will be understood that the device is capable of many modifications in structure and design, without departing from the spirit of the invention, within the scope of the appended claim.

Having thus described the invention, what is claimed and desired to be secured by Letters Patent of the United States, is:

A rake of the character described comprising a handle having forwardly projecting outwardly diverging arms at one end, angular plates on the ends of said arms, said plates having coplanar horizontal flanges and parallel vertical flanges, a rake head having a plurality of tines, a pair of angular members projecting rigidly rearwardly from the head and having horizontal flanges seatable on the horizontal flanges of the angular plates and having vertical flanges lying alongside the vertical flanges of the angular plates, said vertical flanges of the plates and members having registering transverse apertures formed therethrough forwardly of their centers, a pivot rod disposed transversely of the arms and journalled in said apertures with the angular members carrying the head and being swingable about the rod, and springs coiled on the rod, each spring having one of its ends secured to one of the angular plates and the other end bent downwardly from the rod and bearing against the inner surface of the inner end of one of the tines.

EUGENE M. PRUDLO.

References Cited in the file of this patent

UNITED STATES PATENTS

| Number | Name | Date |
| --- | --- | --- |
| 2,164,233 | Dubbs | June 27, 1939 |